United States Patent
Roth et al.

[11] Patent Number: 6,066,695
[45] Date of Patent: *May 23, 2000

[54] METHOD OF PRODUCING THERMOPLASTIC SYNTHETIC RESIN COMPOSITIONS WITH REDUCED DIFFUSION COEFFICIENTS

[75] Inventors: Manfred Roth, Dautphetal; Jürgen Dreier, Marburg, both of Germany

[73] Assignee: Roth Werke GmbH, Dautphetal, Germany

[*] Notice: This patent is subject to a terminal disclaimer.

[21] Appl. No.: 09/139,260

[22] Filed: Aug. 25, 1998

Related U.S. Application Data

[63] Continuation-in-part of application No. 08/852,869, May 8, 1997, Pat. No. 5,877,260.

[30] Foreign Application Priority Data

Feb. 27, 1997 [EP] European Pat. Off. .............. 97103219

[51] Int. Cl.⁷ ............................ C08F 255/00; C08L 23/26
[52] U.S. Cl. ......................... 525/101; 525/108; 525/112; 525/120; 525/132; 525/133; 525/149; 524/100; 524/103; 524/128; 524/238; 524/291
[58] Field of Search ...................................... 525/101, 108, 525/112, 120, 132, 133, 149; 524/100, 103, 128, 291, 238

[56] References Cited

U.S. PATENT DOCUMENTS

| | | | |
|---|---|---|---|
| 3,714,289 | 1/1973 | Schober. | |
| 4,614,773 | 9/1986 | Sugio | 525/391 |
| 4,997,720 | 3/1991 | Bourbonais | 428/500 |
| 5,051,470 | 9/1991 | Woo | 523/411 |

FOREIGN PATENT DOCUMENTS

| | | |
|---|---|---|
| 0685074 | 1/1967 | Belgium. |
| 3005697 | 8/1981 | Germany. |
| 4102181 | 12/1991 | Germany. |
| 9201747 | 2/1992 | WIPO. |

OTHER PUBLICATIONS

Adv Polymer Technology vol. 13, No. 1 pp. 37–47 (1994).

Adv Polymer Technology vol. 13, No. 2 pp. 99–109 (1994).

*Primary Examiner*—Patricia A. Short
*Attorney, Agent, or Firm*—Herbert Dubno; Jonathan Myers

[57] ABSTRACT

A thermoplastic synthetic resin, especially high-density polyethylene, has its diffusion coefficient especially for hydrocarbons, reduced by the addition of 2 to 8% by weight of an additive consisting essentially of at least one phenoxy and/or epoxy resin, and at least one further component selected from the group which consists of at least one radical forming agent and at least one graft copolymerization catalyst, and optional quantities of an antioxidant selected from the group which consists of at least one phenolic antioxidant, at least one phosphitic antioxidant and mixtures thereof, at least one organosilane ester, at least one UV stabilizer, at least one antistatic composition, and polypropylene.

14 Claims, No Drawings

METHOD OF PRODUCING THERMOPLASTIC SYNTHETIC RESIN COMPOSITIONS WITH REDUCED DIFFUSION COEFFICIENTS

CROSS REFERENCE TO RELATED APPLICATION

This is a continuation-in-part of Ser. No. 08/852,869 filed May 8, 1997 now U.S. Pat. No. 5,877,260.

FIELD OF THE INVENTION

Our present invention relates to a reduction of a diffusion coefficient of a thermoplastic synthetic resin and, more particularly, to an additive which can be blended with a thermoplastic synthetic resin for this purpose, to a method of making a thermoplastic composition with a reduced diffusion coefficient and, in general, to the use of a particular mixture as an additive for a thermoplastic synthetic resin for reduction of a diffusion coefficient thereof.

BACKGROUND OF THE INVENTION

Thermoplastic synthetic resins have, among their attributes, a property when they come into contact with gases or liquids, especially aliphatic or aromatic hydrocarbons, that the gas or liquid can diffuse in or through the thermoplastic synthetic resin.

This property, referred to as permeation or penetration of the thermoplastic synthetic resin by the fluid medium can be pronounced and can affect thermoplastic synthetic resins used as containers for these fluids, used as enclosures from which these fluids care to be excluded, or used as conduits through which these fluids are to flow or through which fluids are to flow which are to be protected from the diffusing fluids.

The diffusion of gases or liquids through containers or conduit walls is, as a rule, highly undesirable, especially when the diffusing medium is toxic or noxious or may constitute a contaminant.

In order to minimize the leakage which can result from such diffusion, it is customary to make the walls formed from the thermoplastic synthetic resin sufficiently thick to minimize or exclude such diffusion. That, of course, is highly expensive. The diffusion coefficient, of course, is a measure of the rate at which the diffusing molecules, i.e. the molecules of the fluid medium, migrate through the wall in the direction of the concentration gradient. The diffusion coefficient is as a rule measured in $m^2/S$.

In order to minimize diffusion as described, it has already been proposed (see German patent 41 02 181) to incorporate an additive in the thermoplastic which will reduce the diffusion of hydrocarbons through the thermoplastic material. The additive itself is a thermoplastic and can comprise a thermoplastic carrier, polyvinylidenefluoride and aluminum stearate. The aluminum stearate serves as a binder between the polyvinyladiene fluoride and the thermoplastic carrier material. When hydrocarbons penetrate the thermoplastic synthetic resin blended with this additive or reacted therewith, the presence of the aluminum stearate results in a liquid thickening or gelatinization of the hydrocarbons which significantly reduces the hydrocarbon diffusion.

The synthetic resin reacted with this additive, however, still has a relatively high diffusion coefficient and, over long stand time or periods of use of this thermoplastic synthetic resin as a hydrocarbon container, relatively high loss rates of the fluid medium stored in the container can be observed. This is highly problematical especially when toxic and noxious supplied media. The synthetic resin containing the additive has been found to be only slightly resistant to UV light so that after prolonged exposure to sunlight, there can be some decomposition and structural change in the container. Furthermore, the antistatic properties of the thermoplastic synthetic resin provided with this additive leave much to be desired.

OBJECTS OF THE INVENTION

It is the principal object of the present invention to provide an improved additive for a thermoplastic synthetic resin which can reduce the diffusion coefficient thereof by comparison with conventional and prior art systems.

Another object of the invention is to provide an improved method of reducing the diffusion coefficient of a thermoplastic synthetic resin without creating other drawbacks and thereby provide a thermoplastic synthetic resin composition which is free from drawbacks of prior art systems.

Still another object of the invention is to provide an improved thermoplastic composition which suffers less degradation under ultraviolet light, has lower losses, particularly with respect to hydrocarbons, when used as a container or conduit, and which, in general, provides a greater reduction in the diffusion coefficient of a thermoplastic synthetic resin while affording excellent antistatic properties thereto.

SUMMARY OF THE INVENTION

These objects and others which will become apparent hereinafter are attained, in accordance with the invention with an additive in the form of a mixture of a phenoxy and/or an epoxy resin, at least one free radical forming agent and/or at least one graft copolymerization agent, the mixture being provided in an amount of 2 to 8% by weight of the thermoplastic synthetic resin.

A phenoxy resin according to the invention is a thermoplastic polymer obtained by a reaction of a diphenol with chloromethyloxirane. Phenoxy resins are high molecular weight polyhydroxyethers. A phenoxy resin has no epoxide groups in the phenoxy resin molecules. The molecular weight is preferably greater than 40,000. The epoxy resins with which the invention is concerned contain epoxide groups in the epoxy resin molecules and preferably at least two epoxide groups per epoxy resin molecule. The molecular weight of the epoxy resins which are preferred according to the invention is under 40,000. Preferably the epoxy resin is a reaction product of bisphenol A and epichlorohydrin. In another preferred embodiment the epoxy resin is the reaction product of cresol-novolac and epichlorohydrin.

Preferably the phenoxy resin is a mixture of phenol-4,4'-(1-methylidene)bispolymer and chloromethyl-oxirane.

In the subsequent description, this preferred phenoxy resin will be designated by the abbreviation PKFE. The preferred phenoxy resin has the general formula $(C_{18}O_3H_{20})_x$ with x selected so that the molecular weight is between 40,000 and 100,000.

According to a feature of the invention, the free radical former is a peroxide. Preferably the free radical former is benzoyl peroxide, 2,5-dimethyl-2,5-di-(tertiarybutylperoxy)hexane(DHBP) and/or 1,3-butyleneglycoldimethacrylate. The graft copolymerization catalyst is preferably silver nitrate.

The graft copolymerization catalyst, which is optional but highly preferred in combination with the peroxide, should be capable of the catalyzing graft copolymerization between the thermoplastic synthetic resin and the phenoxy and/or epoxy resin. The radical former and catalyst can be provided as a mixture of a peroxide, especially benzoyl peroxide, and silver nitrate. Of course the free radical former and/or the graft copolymerization catalyst need be contained only in relatively small quantities in the mixture. The peroxide and/or the silver nitrate can be provided in an alcohol solution, preferably in isopropyl alcohol.

According to a further feature of the invention, the mixture can contain at least one phenolic antioxidant and/or at least one phosphitic antioxidant. Phenolic antioxidants are antioxidants with phenolic groups and/or substituted phenol groups. Phosphitic antioxidants are antioxidants in the form of organic phosphites. Preferably the antioxidant component is a mixture of at least one antioxidant of the Formula A1 and/or at least an antioxidant of the Formula A2.

amounts of the antioxidants used, of course, will depend upon the amount of the thermoplastic synthetic resin whose diffusion coefficient is to be reduced.

Preferably the additive of the invention is admixed with a thermoplastic synthetic resin of the polyalkylene type. It has been found that the additive is particularly effective for polyethylene and especially high density polyethylene (HDPE). The ducts, vessels and other articles manufactured from HDPE provided with 2 to 8% by weight of the additive of the invention have been found to be especially tight with

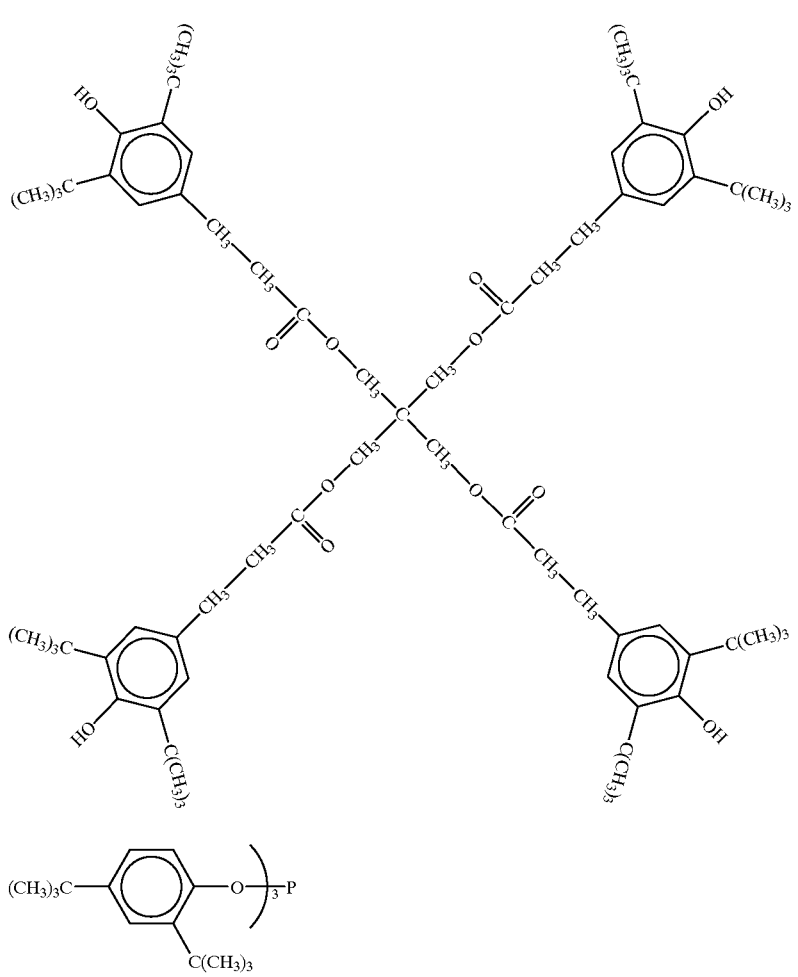

Formula A1

Formula A2

An antioxidant of the formula A1 is the compound pentaerythrityl-tetrakis-[3-(3,5-di-tert.butyl-4-hydroxy-phenyl)propionate]. The antioxidant of the Formula A2 is tris-(2,4-di-tert.butylphenyl)-phosphite.

Of course, the antioxidant can have the Formula A1 with variation of the substituents, especially the alkyl substituents of the phenol rings. Typical substitutions are replacement of methyl by ethyl or propyl or both. The compound of Formula A2 can be modified within the context of the present invention also by providing other substituents on the benzene ring, especially other alkyl groups especially ethyl and propyl. Preferably the antioxidant component consists of a mixture of the antioxidant of Formula A1 and the antioxidant of the Formula A2. The two compounds can be present in a weight ratio of 1:1 in the mixture serving as the additive although a weight ratio of the antioxidant of the Formulas A1 and A2 of A1:A2 =1:2 can be used. The respect to liquid media, particularly hydrocarbons. The additive, may, however, be used with other thermoplastic synthetic resins as well, namely, low density polyethylene (LDPE) and polypropylene. Preferably the additive is used in an amount of up to 5% by weight of the thermoplastic synthetic resin (in terms of the thermoplastic synthetic resin itself) and preferably in an amount of 2 to 5% by weight.

It has been found to be particularly advantageous to provide the additive as a mixture of a phenoxy and/or epoxy resin and an antioxidant of the organosilane ester type. The organosilane ester appears to function in the system of the invention as a monomer which is bonded to the thermoplastic synthetic resin in the presence of the aforementioned graft copolymerization catalyst, i.e. by a graft copolymerization reaction as will be described below. The monomer thus bonded to the thermoplastic synthetic resin serves as a binder between the latter and the phenoxy and/or epoxy resin which is bonded to a polymer side chain of the composite formed with the thermoplastic synthetic resin.

A preferred organosilane ester is 1-propane-amine-3-triethoxysilane with the formula $NH_2(CH_2)_3Si(OC_2H_5)_3$. Within the invention, moreover, an organic compound with at least one vinyl group can be provided as a monomer which is linked to the thermoplastic synthetic resin in the manner described. The monomer can be an organic compound which in the context of the graft copolymerization, can be a bridge between the polymer chain of the thermoplastic synthetic resin and the phenoxy resin and which bonds to a polymer side chain.

In a preferred embodiment of the invention, the mixture of the phenoxy resin and the antioxidant additionally includes a UV stabilizer.

The UV stabilizer can be a sterically-hindered amine (HALS). The most preferred stabilizer is poly[[6-[(1,1,3,3-tetramethylbutyl)amino]-s-triazine-2,4-diyl] [(2,2,6,6-tetramethyl-4-piperidyl)imino]hexamethylene [(2,2,6,6-tetramethyl-4-piperidyl)imino]]. That compound is hereinafter designated as U1.

In a preferred embodiment of the invention, the mixture of the phenoxy resin and the antioxidant additionally contains at least one antistatic component. The preferred antistatic component is an ethoxylated amino. The antistatic component can be a mixture of a short-term antistatic agent and a long-term antistatic agent, for example, a mixture of glycerinemonostearate and an alkylaminethoxylate. Because of the presence of the antistatic agent, the workability of the thermoplastic synthetic resin is improved. According to a further feature of the invention, the mixture forming the additive additionally contains a quantity of polypropylene. Surprisingly, the polypropylene in the additive plays an important role in the reduction of the diffusion coefficient in thermoplastic synthetic resins other than polypropylene, especially the polyethylene.

The invention thus comprises, not only the aforedescribed method of reducing a diffusion coefficient of a thermoplastic resin by blending into the thermoplastic synthetic resin 2 to 8% by weight of an additive consisting essentially of at least one phenoxy resin and/or epoxy, and at least one further component selected from the group which consists of at least one radical forming agent and at least one graft copolymerization catalyst, but also a thermoplastic synthetic resin composition comprising a blend of a thermoplastic and an additive mixture. That mixture can consist essentially of a thermoplastic and an additive mixture lowering diffusion of liquids and gases in the thermoplastic, the mixture being present in an amount of 2 to 8% by weight of the thermoplastic and consisting essentially of at least one phenoxy and/or epoxy resin, and at least one further component selected from the group which consists of at least one radical forming agent and at least one graft copolymerization catalyst, and optional quantities of an antioxidant selected from the group which consists of at least one phenolic antioxidant, at least one phosphitic antioxidant and mixtures thereof, at least one organosilane ester, at least one UV stabilizer, at least one antistatic composition, and polypropylene.

SPECIFIC DESCRIPTION

In the description below we have provided details of the additive composition and the method of the invention. Unless indicated otherwise, all quantities are given in terms of percent by weight.

Preferably, the mixture forming the additive of the present invention comprises 60 to 75% by weight, preferably 65 to 71% by weight of the phenoxy and/or epoxy resin. Of a phenoxy or epoxy component which makes up 60 to 75% by weight of the additive, from 0% to 100% may be the phenoxy resin while the epoxy resin forms the balance from 100% to 0%. A 1% alcoholic solution of a peroxide, preferably benzoyl peroxide, is incorporated in an amount of 0.15 to 0.25% by weight, preferably 0.19 to 0.23% by weight, in a mixture. The mixture also preferably contains an amount of 0.15 to 0.25% by weight, preferably 0.19 to 0.23% by weight, of an 0.1% aqueous solution of silver nitrate. The proportion of the antioxidant in the mixture should amount to 1.5 to 2.5% by weight, preferably 2 to 2.3% by weight. The proportion of the UV stabilizer in the mixture should amount to 2 to 10% by weight, preferably 3 to 9% by weight. The mixture should contain at least one antistatic agent, preferably in a proportion of 3 to 10% by weight of the mixture, preferably 4 to 8% by weight. The additive mixture can contain 10 to 20% by weight polypropylene, preferably 12 to 18% by weight.

The invention is based upon our discovery that thermoplastic synthetic resins and particularly polyethylene, especially high density polyethylene (HDPE) when blended with the additive of the invention tends to form a molecular bond with the components of the additive. This chemical bond is, as can be best ascertained, a so-called graft copolymerization. The graft copolymers are macropolymers whose side chains differ structurally form the main side chain of the thermoplastic synthetic resin. The phenoxy and/or epoxy resin thus constitutes a prepolymer to which the main chain of the thermoplastic synthetic resin, preferably polyethylene, is bonded under a monomer-like an organosilane ester then simultaneously acts as a bridge between the main chain and the phenoxy and/or epoxy resin. The additive is admixed with the thermoplastic synthetic resin and the components of the additive undergo chemical bonding with the thermoplastic synthetic resin in the sense of graft copolymerization. This chemical bonding has the advantage that the additive is fixed in the thermoplastic synthetic resin and thus cannot migrate therein.

The resulting thermoplastic containing the additive of the invention has been found to be surprisingly resistant to the diffusion of fluid media, especially hydrocarbons, as well as water vapor and even water in the liquid form. The diffusion coefficient of the thermoplastic synthetic resin modified in accordance with the invention is substantially lower than the diffusion coefficient of thermoplastic synthetic resins not containing the additive of the invention and prior to the blending of the additive therewith. The invention has been found to be particularly advantageous for thermoplastic synthetic resins which are used to fabricate containers or duct work for toxic or noxious fluid media and as to which leakage of the fluid medium may be an environmental hazard.

In addition the synthetic resin modified with the additive of the invention has been found to be surprisingly resistant to the effect of ultraviolet light. The modified thermoplastic synthetic resin has advantageous antistatic properties as well. Because of the bonding of the additive or the components thereof to the thermoplastic of the synthetic resin into which the additive is blended, there is little loss of the additive components during the life of the fabricated product, for example, from a washing out of the additive.

Advantageously the amount of the additive which is used is about 5% by weight of the thermoplastic synthetic resin, preferably polyethylene, and is combined therewith at room temperature. The thermoplastic synthetic resin containing the additive can be processed in the usual manner for the thermoplastic by the usual equipment, for example, blenders, extruders and the like and the product can preferably be formed by extrusion or injection molding. In fact, the processing of the thermoplastic containing the additive by any of the conventional techniques has been found to be simpler and to require less energy to obtain plastification, complete homogenization and an especially homogeneous temperature distribution.

It has been found to be advantageous to dilute the additive, prior to its admixture to the full batch of the thermoplastic synthetic resin as a smaller quantity of the thermoplastic synthetic resin and the blended dilute additive then combined with the remainder of the thermoplastic synthetic resin which can be further blended in a worm-type extruding unit before being shaped by extrusion or injection molding. During this processing, even at the usual processing temperatures, which can be close to room temperature or the temperatures developed by friction during the blending process, the additive appears to chemically react with the polymer chains of the thermoplastic synthetic resin. The dilution of the additive with the thermoplastic synthetic resin first appears to ensure a uniform distribution of the additive in the final product so that the advantages of the additive, especially in enhancing the properties of the thermoplastic synthetic resin and reducing the diffusion coefficient, are homogeneous throughout the bodies fabricated from the thermoplastic synthetic resin.

While the graft polymerization has been utilized widely in the fabrication of synthetic resin compositions, graft copolymerization with phenoxy and/or epoxy resins for reducing the diffusion coefficient of a thermoplastic synthetic resin is not, to our knowledge, in the prior art. This graft copolymerization is discussed in greater detail below.

In the graft copolymerization, initially the polymer chains of the substrate, in the present case the thermoplastic synthetic resin, are activated in that in the graft copolymerization initiation, hydrogen atoms appear to be removed from the polymer chains. At the locations at which hydrogen atoms are removed, monomerprepolymer chains are arranged by carbon-carbon bonds and appear to grow as polymer side chains. The copolymerization contributes new and advantageous properties to the substrate without adversely affecting the original positive properties of the unmodified substrate. The graft copolymerization is described further in conjunction with a reaction scheme for high density polyethylene (HDPE) exclusively for clarification purposes and without thereby intending to limit the scope of the invention. A hydrogen atom is removed from the substrate, i.e. from the polyethylene chain, with the aid of a graft copolymerization initiator so that a free radical results.

1. Formation of the free radical with the aid of the graft copolymerization initiator:

S—H+GI⁺→S˙+GI(HDPE) (Graft Copolymerization Initiator)

2. The free radical then reacts with the monomer. That begins the graft copolymerization and the growth of the side chains on the substrate S, i.e. on the polyethylene chains:

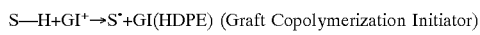

(Monomer) (Initiator)

3. Chain development:

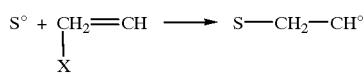

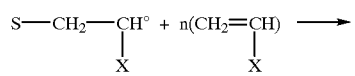

In the context of the invention the monomer units of the phenoxy and/or epoxy resin are connected to the polyethylene chain in the side chains.

4. Reforming of the graft copolymerization initiator with the aid of a peroxide:

R₁OH+GI⁺→R₁O˙+H⁺+GI(Peroxide) (Initiator)

5. The chain interruption reaction can occur by free radical combination, for example in accordance with the following reaction:

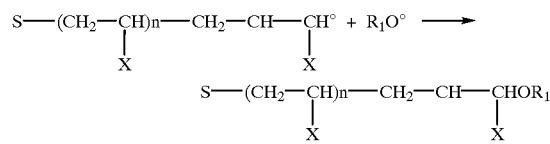

6. In the presence of the peroxide, the following chain interruption reaction can occur:

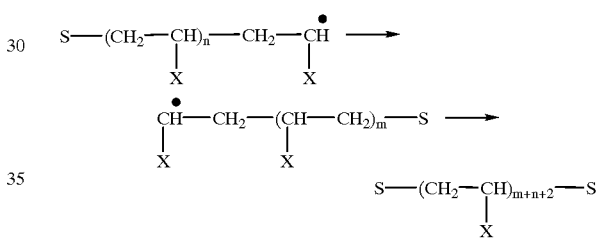

where m and n are integers.

The antioxidant component incorporated in the additive in accordance with the invention serves as a processing stabilizer for the thermoplastic synthetic resin and has the function of capturing surplus from radicles which might otherwise continue the polymerization reaction in an uncontrolled manner, thereby avoiding fragmentation of the polyethylene main chains which might otherwise result from the presence of an excess of free radicals.

SPECIFIC EXAMPLES

The invention is further described below in connection with specific examples. The phenoxy and/or epoxy resin is introduced into a vessel and the organosilane ester (as monomer) and the benzoyl peroxide/silver nitrate mixture (as free radical former and catalyst) as well as the remaining additive components of Examples 1–3 are then added and blended to form a uniform mixture. The resulting additive can then be admixed to the high density polyethylene (HDPE) at room temperature with the additive amounting to say 2 to 5% by weight of the polyethylene. The polyethylene with the additive blended therewith can be further processed and fabricated by extrusion or injection molding. The processed polyethylene which results has a very low diffusion coefficient and excellent antistatic properties. Examples 1–3 provide specific compositions of the additives which have been preferred.

EXAMPLE 1

|  | Weight Percent |
| --- | --- |
| Phenoxy resin (PKFE) | 66.2 |
| Antioxidant (A1 and A2 in weight ratio 1:1) | 2.21 |
| UV-Stabilizer (U1) | 8.83 |
| Antistatic agent (Glycerinemonostearate, Alkylamine ethoxylate) | 6.6 |
| Polypropylene | 15.5 |
| 1-Propanamine-3-triethoxysilane | 0.22 |
| Benzoylperoxide (1% in isopropyl alcohol) | 0.22 |
| Silver nitrate (0.1% in isopropyl alcohol) | 0.22 |

EXAMPLE 2

|  | Weight Percent |
| --- | --- |
| Phenoxy resin (PKFE) | 70.3 |
| Antioxidant (A1 and A2 in weight ratio 1:1) | 2.0 |
| UV-Stabilizer (U1) | 3.0 |
| Antistatic agent (Glycerinemonostearate, Alkylamine ethoxylate) | 6.0 |
| Polypropylene | 14.1 |
| 1,3-Butyleneglycoldimethacrylate | 4.0 |
| 1-Propanamine-3-triethoxysilane | 0.2 |
| Benzoylperoxide (1% in isopropyl alcohol) | 0.2 |
| Silver nitrate (0.1% in isopropyl alcohol) | 0.2 |

EXAMPLE 3

|  | Weight Percent |
| --- | --- |
| Phenoxy resin (PKFE) | 67.6 |
| Antioxidant (A1 and A2 in weight ratio 1:1) | 0.22 |
| UV-Stabilizer (U1) | 9.0 |
| Antistatic agent (Glycerinemonostearate, Alkylamine ethoxylate) | 6.76 |
| Polypropylene | 15.76 |
| 1-Propanamine-3-triethoxysilane | 0.22 |
| Benzoylperoxide (1% in isopropyl alcohol) | 0.22 |
| Silver nitrate (0.1% in isopropyl alcohol) | 0.22 |

EXAMPLE 4

|  | Weight Percent |
| --- | --- |
| Epoxy resin reaction product of bisphenol A and epichlorohydrin | 66.2 |
| Antioxidant (A1 and A2 in weight ratio 1:1) | 2.21 |
| UV-Stabilizer (U1) | 8.83 |
| Antistatic agent (Glycerinemonostearate, Alkylamine ethoxylate) | 6.6 |
| Polypropylene | 15.5 |
| 1-Propanamine-3-triethoxysilane | 0.22 |
| Benzoylperoxide (1% in isopropyl alcohol) | 0.22 |
| Silver nitrate (0.1% in isopropyl alcohol) | 0.22 |

EXAMPLE 5

|  | Weight Percent |
| --- | --- |
| Reaction product of cresol-novolac and epichlorohydrin | 66.2 |
| Antioxidant (A1 and A2 in weight ratio 1:1) | 2.21 |
| UV-Stabilizer (U1) | 8.83 |
| Antistatic agent (Glycerinemonostearate, Alkylamine ethoxylate) | 6.6 |
| Polypropylene | 15.5 |
| 1-Propanamine-3-triethoxysilane | 0.22 |
| Benzoylperoxide (1% in isopropyl alcohol) | 0.22 |
| Silver nitrate (0.1% in isopropyl alcohol) | 0.22 |

EXAMPLE 6

|  | Weight Percent |
| --- | --- |
| Phenoxy resin (PKFE) | 33.1 |
| Epoxy resin (reaction product of bisphenol A and epichlorohydrin) | 33.1 |
| Antioxidant (A1 and A2 in weight ratio 1:1) | 2.21 |
| UV-Stabilizer (U1) | 8.83 |
| Antistatic agent (Glycerinemonostearate, Alkylamine ethoxylate) | 6.6 |
| Polypropylene | 15.5 |
| 1-Propanamine-3-triethoxysilane | 0.22 |
| ZHDP | 0.22 |
| Silver nitrate (0.1% in isopropyl alcohol) | 0.22 |

Unless otherwise indicated, where the term "alkyl" has not been defined previously, it may refer to $C_1$ to $C_{10}$ straight or branched-chain alkyl.

We claim:

1. A method of reducing a diffusion coefficient of a polyalkylene thermoplastic synthetic resin, comprising blending into said polyalkylene thermoplastic synthetic resin 2 to 8% by weight of an additive comprising a resin component selected from the group which consists of at least one phenoxy resin, at least one epoxy resin and a mixture of at least one phenoxy resin and at least one epoxy resin, at least one organosilane, and at least one peroxide radical forming agent.

2. The method defined in claim 1 wherein said additive further comprises a graft copolymerization catalyst.

3. The method defined in claim 2 wherein said phenoxy resin is present in said additive and said phenoxy resin is a product of phenol-4,4'-(1-methylidene)bispolymer and chloromethyl-oxirane.

4. The method defined in claim 2 wherein an epoxy resin is present in said additive and is a reaction product of Bisphenol A and epichlorohydrin or cresol-novolac and epichlorohydrin.

5. The method defined in claim 1 wherein said radical forming agent is selected from the group which consists of 1,3-butyleneglycoldimethacrylate, 2,5-dimethyl-2,5-di-(tert.butylperoxy)hexane and benzoyl peroxide and mixtures thereof.

6. The method defined in claim 2 wherein said graft copolymerization catalyst is silver nitrate.

7. The method defined in claim 1 further comprising the step of adding to said thermoplastic synthetic resin in admixture with said additive an antioxidant selected from the group which consists of at least one phenolic antioxidant, at least one phosphitic antioxidant and mixtures thereof.

8. The method defined in claim 7 wherein the antioxidant added to said thermoplastic synthetic resin in admixture with said additive is a mixture of a compound of the Formula A1.

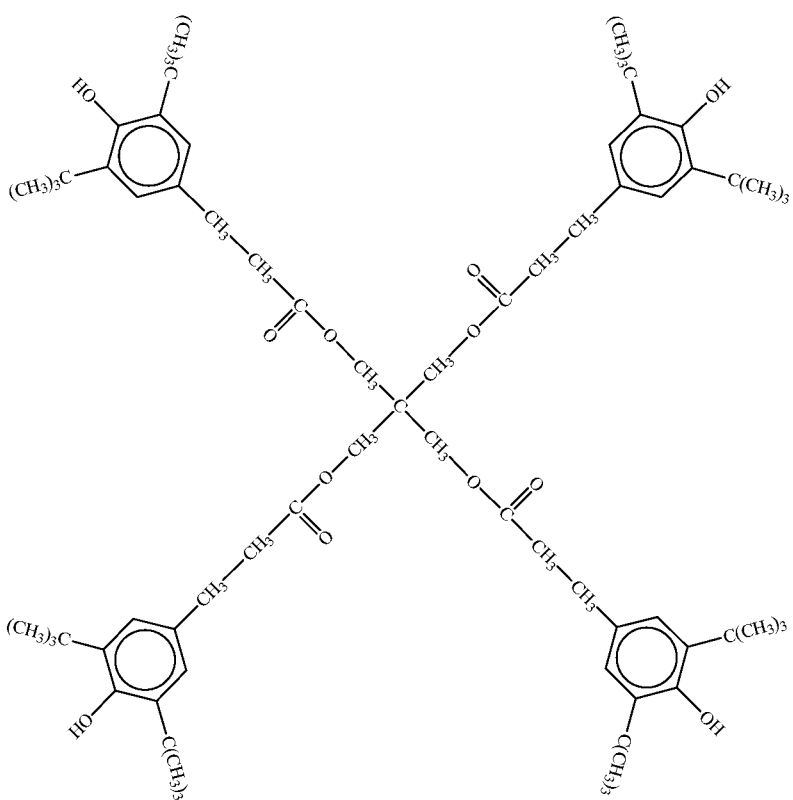

Formula A1 with a compound of the Formula A2:

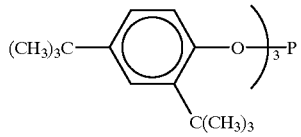

Formula A2

9. The method defined in claim 1, further comprising the step of adding to said thermoplastic synthetic resin in admixture with said additive at least one UV stabilizer.

10. The method defined in claim 9 wherein said UV stabilizer is poly[[6-[(1,1,3,3, -tetramethylbutyl)amino]-s-triazine-2,4-diyl][(2,2,6,6-tetramethyl-4-piperidyl)imino]hexamethylene[(2,2,6,6-tetramethyl-4-piperidyl)imine)].

11. The method defined in claim 1, further comprising the step of adding to said thermoplastic synthetic resin in admixture with said additive at least one antistatic composition.

12. The method defined in claim 11 wherein said antistatic composition is a mixture of glycerinemonostearate and an alkylamine stearate.

13. The method defined in claim 1, further comprising the step of adding to said thermoplastic synthetic resin in admixture with said additive an amount of polypropylene.

14. The method defined in claim 1 wherein said thermoplastic synthetic resin is high density polyethylene.

* * * * *